Patented June 25, 1929.

1,718,493

UNITED STATES PATENT OFFICE.

HANS SCHMIDT, OF VOHWINKEL, NEAR ELBERFELD, GERMANY, ASSIGNOR TO WINTHROP CHEMICAL COMPANY, INC., OF NEW YORK, N. Y.

COMPLEX METAL COMPOUND OF PYROGALLOL SULPHONIC ACID.

No Drawing. Original application filed April 30, 1927, Serial No. 188,040, and in Germany February 6, 1924. Divided and this application filed June 28, 1928. Serial No. 289,068.

The object of my invention is the manufacture of soluble complex organo metallic compounds which have a neutral reaction. This important requirement in itself, as is well known, constitutes a problem in medicinal dispensing in the case of many substances which are applied therapeutically.

According to one feature of this invention, complex organo compounds with pyrogallol sulphonic acids are manufactured by causing a compound of a metal to react with a pyrogallol sulphonic acid or a salt thereof. In this specification the expression "metal" shall include arsenic.

To obtain compounds having a neutral reaction it is very often necessary for the reaction to be carried out with the addition of an alkali, ammonia or an amine. The term "alkali" may be conveniently used to designate both fixed and volatile alkalies and is used in that sense in the appended claims.

A simple method of manufacture consists in dissolving the hydroxide of the respective metal in the solution of a pyrogallol sulphonic acid in alkali or an amine with the addition of alkali or amine, such that at the termination of the reaction the solution possesses a neutral reaction.

From the latter direction it is obvious that for the formation of a salt dissolving with a neutral reaction the quantity of alkali or amine, which is combined with the acid residue of the pyrogallol derivative, is in general not sufficient to produce neutrality, but that the complex as such requires still further alkali or amine for the production of a neutral reaction. With some metallic oxides, as for example with cadmium, a salt exhibiting a neutral reaction can be obtained without the addition of alkali.

Such complex salts can, for example, be prepared from metals such as cadmium, iron, manganese, zinc, chromium, tin, vanadium, copper, gold, calcium, arsenic, lead.

From a single oxide various complex salts can be obtained according to the quantity of the metal compound which has interacted with the organo compound producing the formation of the complex compounds.

The invention is illustrated in the accompanying examples:

*Example 1.*—20 grams of the potassium salt of pyrogallol disulphonic acid are boiled for some time in 100 cc. of water with 6 grams of antimonyoxide and sufficient caustic potash lye in order that the completion of the operation a neutral reaction may obtain. When no further antimonyoxide passes into solution the whole is filtered, the liquid concentrated and stirred into methyl alcohol. The complex antimony salt is thereby precipitated and on separation is obtained in the form of a colorless or weakly colored powder of the probable formula:

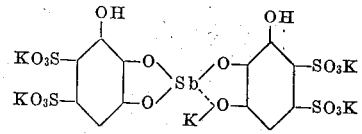

It is easily soluble in water, the aqueous solution remaining clear in the addition of dilute caustic soda lye or dilute sulfuric acid.

*Example 2.*—A solution of 20 grams of the potassium salt of pyrogallol disulfonate in 100 cc. of water is caused to dissolve a suspension of bismuth oxide prepared from 24 grams of bismuth nitrate by treatment with alkali and washing, heating being resorted to. The liquid is neutralized with caustic potash lye and filtered. The new complex bismuth compound is separated from the filtrate by evaporation or concentration and precipitation with methyl alcohol in the form of a yellowish brown powder, which is soluble in water. The solution is likewise not precipitated by excess of alkali lye. Hydrogen sulfide precipitates bismuth sulfide.

The complex salts of other metals are formed in an analogous manner.

Instead of pyrogallol disulphonic acid other sulphonic acids of pyrogallol can be applied. For the formation of the salts other alkalis, ammonia or amines can be employed.

By selecting other proportions of materials as in the case of the further examples, salts can be obtained possessing a different content of metallic oxide.

*Example 3.*—30 grams of the potassium salt of pyrogallol disulfonate are dissolved in 100 cc. of hot water and an aqueous suspension of stannous hydroxide is introduced, prepared from a solution of 22.5 grams of stannous chloride in water by precipitation with ammonia, washing and stirring with water. Dilute caustic potash lye is added until the solution is practically neutral, when it is filtered from undissolved materials and the filtrate evaporated in vacuo. The preparation and storing should be effected in the absence of air as far as is possible. A slightly colored powder is obtained which dissolves easily in water. Hydrogen sulfide precipitates tin sulfide.

*Example 4.*—When preparing complex cadmium compounds, products with differing cadmium content can be obtained according to the respective mode of working as shown by the following data:

In an aqueous solution of the potassium salt of pyrogallol disulphonic acid, which is heated to the boiling temperature and with the simultaneous passage of hydrogen, cadmium hydroxide is dissolved to the extent required for the production of a neutral or only weakly alkaline solution. On cooling the liquid is filtered and the complex compound is precipitated by pouring the solution into methyl alcohol. The salt contains 15% of cadmium and forms a greenish crystalline powder.

If the above compound is treated with an excess of caustic potash lye and thereupon with kaolin for the purpose of absorbing any colloidal cadmium hydoxide and the whole is then filtered, methyl alcohol causes the separation from this filtrate of a yellow complex compound containing only 4% of cadmium.

Cadmium carbonate can be also employed for the manufacture of a complex cadmium compound, when a compound containing 12% of cadmium results.

All these compounds are easily soluble in water.

*Example 5.*—20 grams of the potassium salt of pyrogalloldisulphonic acid are dissolved in water and vanadyl hydroxide, prepared from 7 grams of ammonium vanodate by reduction, is then added. Dilute caustic potash lye is used for rendering the reaction neutral after which the whole is filtered and the filtrate is precipitated by pouring into methyl alcohol. After filtration and drying a deep dark blue powder is obtained, which dissolves easily in water.

*Example 6.*—40 grams of the potassium disulfonate of pyrogallic acid are boiled under reflux with 12 grams of manganese carbonate in 150 cc. of water in a stream of carbon dioxide until a clear solution results. Occasionally there remains at the bottom a small white residue of excess of manganese carbonate which is easily separated. The solution is neutral and after cooling is filtered rapidly and stirred into 800 cc. of methyl alcohol. The complex manganese salt which is thereby precipitated is filtered, washed with methyl alcohol and dried in vacuo. It then forms a yellowish green powder, which in contact with the air becomes deep yellow; it dissolves readily in water with a neutral reaction and a bright green coloration.

*Example 7.*—30 grams of the potassium salt of pyrogallolmonosulphonic acid are dissolved in 200 cc. of water, 15 grams of antimony oxide are added and the solution is then boiled. 2 N caustic potash lye is introduced until the solution is just neutral, boiling being continued for a short time. After filtration the complex salt crystallizes from the filtrate on cooling. By the addition of alcohol the separation can be rendered complete. The product dissolves easily in water, no precipitation being caused on the addition of dilute caustic soda lye or sulfuric acid. Hydrogen sulfide precipitates antimony sulfide from the acidified solution.

*Example 8.*—4 grams of the potassium salt of pyrogallol disulphonic acid are dissolved in 15 cc. of water, the solution is neutralized with dilute caustic potash lye and cooled. Thereupon 2.2 grams of lead oxide are added in the form of a powder. The greater part of the lead oxide dissolves in the solution to which, if necessary, dilute potash lye is further added until neutralization is effected. After filtration from any undissolved lead oxide the filtrate is precipitated by pouring into methyl alcohol. By filtering, washing and drying, the complex lead salt is obtained. It dissolves easily in water the solution not being precipitated by excess of caustic soda lye. Hydrogen sulfide causes the formation of lead sulfide.

This is a division of my copending application Ser. No. 188,040, filed April 30, 1927.

I claim:

1. The process for producing a new complex organo metallic compound by causing a compound of a metal other than the alkali metals to react with a pyrogallol sulphonic acid compound.

2. A process as claimed in claim 1, in which the reaction is carried out with the addition of an alkali.

3. A process for producing a new complex pyrogallol disulphonic acid-antimony compound by causing the potassium salt of pyrogallol disulphonic acid to react with antimony oxide in the presence of caustic potash lye at boiling temperature.

4. As a new article of manufacture a product being chemically a complex organo metallic compound of a pyrogallol sulphonic acid and a metal other than the alkali metals, being soluble in water with a neutral reaction and being a valuable pharmaceutical product.

5. A complex pyrogallol disulphonic acid-antimony compound of the probable formula:

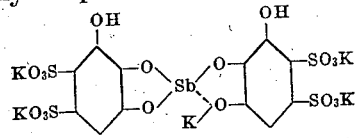

being soluble in water with a neutral reaction and being a valuable pharmaceutical product.

In testimony whereof I have hereunto set my hand.

HANS SCHMIDT.